(12) United States Patent
Tsai

(10) Patent No.: US 8,767,883 B2
(45) Date of Patent: Jul. 1, 2014

(54) RECOVERABLE ETHERNET RECEIVER

(75) Inventor: Tien-Ju Tsai, Tainan (TW)

(73) Assignee: Himax Media Solutions, Inc., Tainan (TW)

( * ) Notice: Subject to any disclaimer, the term of this patent is extended or adjusted under 35 U.S.C. 154(b) by 520 days.

(21) Appl. No.: 13/191,240

(22) Filed: Jul. 26, 2011

(65) Prior Publication Data

US 2013/0028311 A1   Jan. 31, 2013

(51) Int. Cl.
*H04L 27/06* (2006.01)
(52) U.S. Cl.
USPC ........... 375/340; 375/233; 375/316; 375/219; 375/229; 370/476; 370/466; 714/701; 714/746
(58) Field of Classification Search
USPC .......... 375/233, 340, 316, 219, 229; 370/476, 370/466; 714/701, 746
See application file for complete search history.

(56) References Cited

U.S. PATENT DOCUMENTS

| | | | | |
|---|---|---|---|---|
| 6,088,827 | A * | 7/2000 | Rao | 714/786 |
| 6,823,483 | B1 * | 11/2004 | Creigh | 714/701 |
| 7,170,947 | B2 * | 1/2007 | Curran et al. | 375/265 |
| 7,188,302 | B2 * | 3/2007 | Lin et al. | 714/794 |
| 7,633,965 | B2 * | 12/2009 | Shibata et al. | 370/463 |
| 8,270,389 | B2 * | 9/2012 | Parnaby | 370/350 |
| 2003/0115541 | A1 * | 6/2003 | Azadet et al. | 714/796 |
| 2005/0005189 | A1 * | 1/2005 | Khermosh et al. | 714/4 |
| 2005/0012646 | A1 * | 1/2005 | Kang et al. | 341/58 |
| 2005/0041727 | A1 * | 2/2005 | Agazi | 375/219 |
| 2005/0111532 | A1 * | 5/2005 | Creigh | 375/219 |
| 2008/0069144 | A1 * | 3/2008 | Yu et al. | 370/476 |
| 2010/0042865 | A1 * | 2/2010 | Creigh | 713/503 |

* cited by examiner

*Primary Examiner* — Kenneth Lam
(74) *Attorney, Agent, or Firm* — Stout, Uxa, Buyan & Mullins, LLP; Donald E. Stout

(57) ABSTRACT

The present invention is directed to a recoverable Ethernet receiver. A joint decision feedback equalizer (DFE) and Trellis decoder is configured to decode a receiving signal to result in a received symbol, and configured to generate a check-idle value which is used to indicate an idle mode. A physical coding sublayer (PCS) block is configured to generate a seed value and a polarity characterization according to the received symbol, with the joint DFE and Trellis decoder generating the check-idle value according to the seed value and the polarity characterization.

13 Claims, 14 Drawing Sheets

PAM5 Constellation
and 1D Symbol Subset

4D Symbol Subset Partition

|   | Pair ABCD |   | Pair ABCD |
|---|---|---|---|
| s0 | XXXX | U | YYYY |
| s1 | XXXY | U | YYYX |
| s2 | XXYY | U | YYXX |
| s3 | XXYX | U | YYXY |
| s4 | XYYX | U | YXXY |
| s5 | XYYY | U | YXXX |
| s6 | XYXY | U | YXYX |
| s7 | XYXX | U | YXYY |

FIG3B

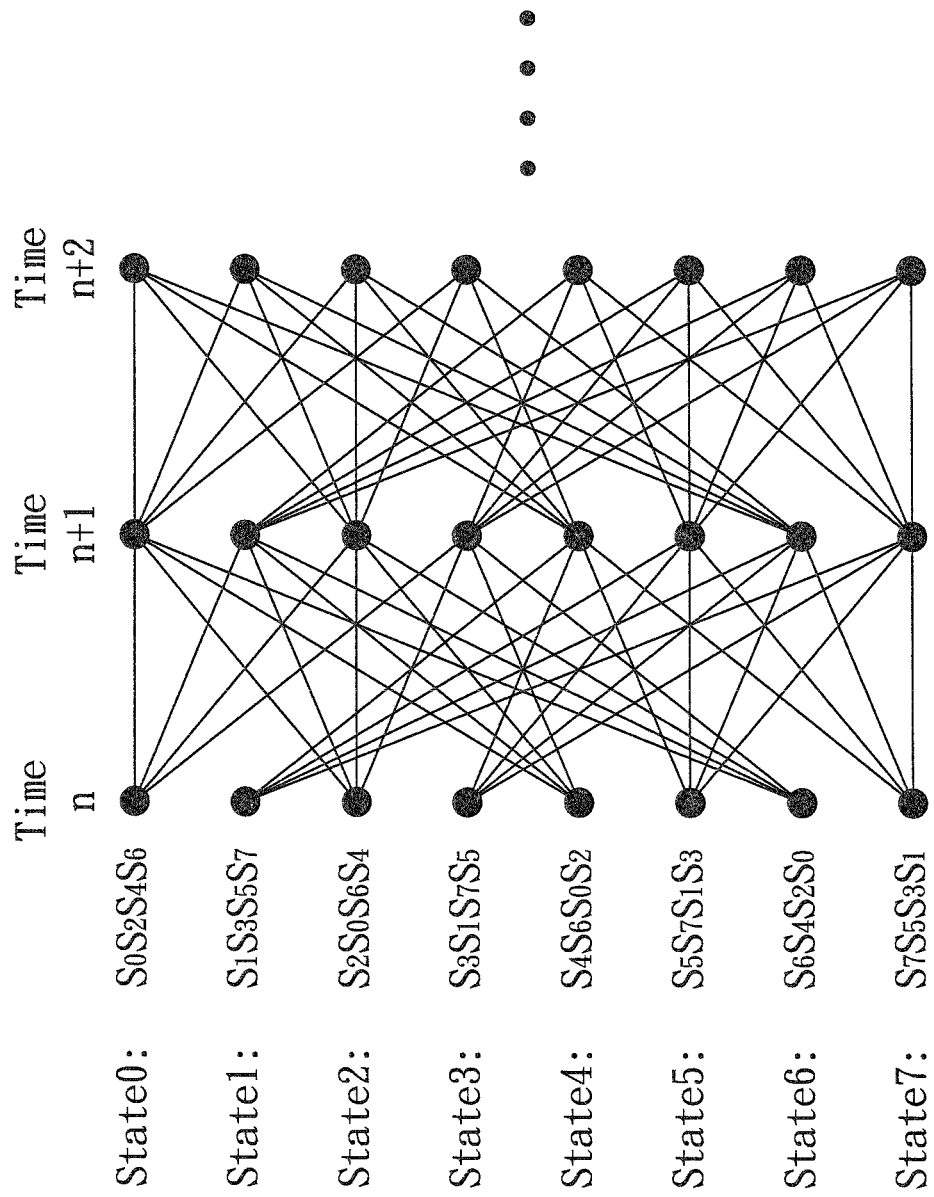

RECOVERABLE ETHERNET RECEIVER

CROSS-REFERENCE TO RELATED APPLICATIONS

The present invention is related to a co-pending U.S. patent application filed on Jul. 26, 2011, by the same inventor of the present application and assigned to the same assignee of the present application, entitled JOINT DECISION FEEDBACK EQUALIZER AND TRELLIS DECODER Ser. No. 13/191,268, the complete subject matter of which is hereby incorporated herein by reference in its entirety.

BACKGROUND OF THE INVENTION

1. Field of the Invention

The present invention generally relates to a communication receiver, and more particularly to a recoverable Ethernet receiver.

2. Description of Related Art

Ethernets following 10BASE-T, 100 BASE-TX, 1000BASE-T standards, and higher-speed Ethernets, use unshielded twisted pair (UTP) transmission medium. As link speed increases, it becomes more difficult to design the physical layer (PHY), when considering constraints such as multipath fading, pulse/white noise, adjacent/co-channel interferences in wireless channel, or inter-symbol interference (ISI), (near-end or far-end) channel crosstalk, echo or thermal noise in wired channel. In, gigabit Ethernet (1000BASE-T), Trellis-coded modulation (TCM) is used as error control coding (ECC), which may, in theory, achieve a coding gain of 5.6 dB.

Viterbi decoders are commonly used to decode TCM code. However, it is noticed that the target 5.6 dB coding gain cannot be satisfactorily achieved by the conventional transceiver, particularly the transceiver having a separate Viterbi decoder and ISI post-cursor equalizer that may result in error propagation. In order to improve the coding gain, and error propagation, Kamran Azadet discloses a 1-tap lookahead-parallel decision, feedback decoder (LA-PDFD) in "A 1-Gb/s Joint Equalizer and Trellis Decoder for 1000BASE-T Gigabit Ethernet," IEEE Journal of Solid-State Circuits, Vol. 36, No. 3, March 2001; and U.S. Pat. No. 7,363,576 entitled "Method and Apparatus for Pipelined Joint Equalization and Decoding for Gigabit Communications," the disclosures of which are hereby incorporated by reference. The scheme disclosed by Azadet, however, cannot effectively improve the coding gain with respect to Ethernet having a link segment length greater than the specified 100 m. In order to resolve this problem, Lin et al. discloses a P-tap parallel decision feedback decoder (PDFD) in U.S. Pat. No. 7,188,302 entitled "Parallel Decision-Feedback Decoder and Method for Joint Equalizing and Decoding of Incoming Data Stream," the disclosure of which is hereby incorporated by reference.

TCM is a convolutional code, in which relationship highly exists among parts of the codes. Accordingly, error propagation or burst error may occasionally occur at the receiver end, and may even, result in error catastrophe if not detected and recovered in time.

For the foregoing reasons, a need has arisen to propose a novel scheme that can promptly detect and recover from error.

SUMMARY OF THE INVENTION

In view of the foregoing, it is an object of the embodiment of the present invention to provide a recoverable communication receiver adaptable to an Ethernet transceiver for correctly and promptly detecting an idle mode and a data mode in order to prevent error propagation.

According to one embodiment, the recoverable Ethernet receiver comprises a physical coding sublayer (PCS) block, and a joint decision feedback equalizer (DFE) and Trellis decoder. The joint decision feedback equalizer (DFE) and Trellis decoder is configured to decode a receiving signal to result in a received symbol, and configured to generate a check-idle value to indicate an idle mode. The physical coding sublayer (PCS) block is configured to generate a seed value and a polarity characterization according to the received, symbol, wherein the joint DFE and Trellis decoder generates the check-idle value according to the seed value and the polarity characterization.

BRIEF DESCRIPTION OF THE DRAWINGS

FIG. 3A shows a 1D symbol set for a five-level pulse amplitude modulation (PAM5) constellation;

FIG. 3B shows 4D symbol subset partition;

FIG. 4 shows trellis state transition of a convolutional code;

DETAILED DESCRIPTION OF THE INVENTION

Figure 1:
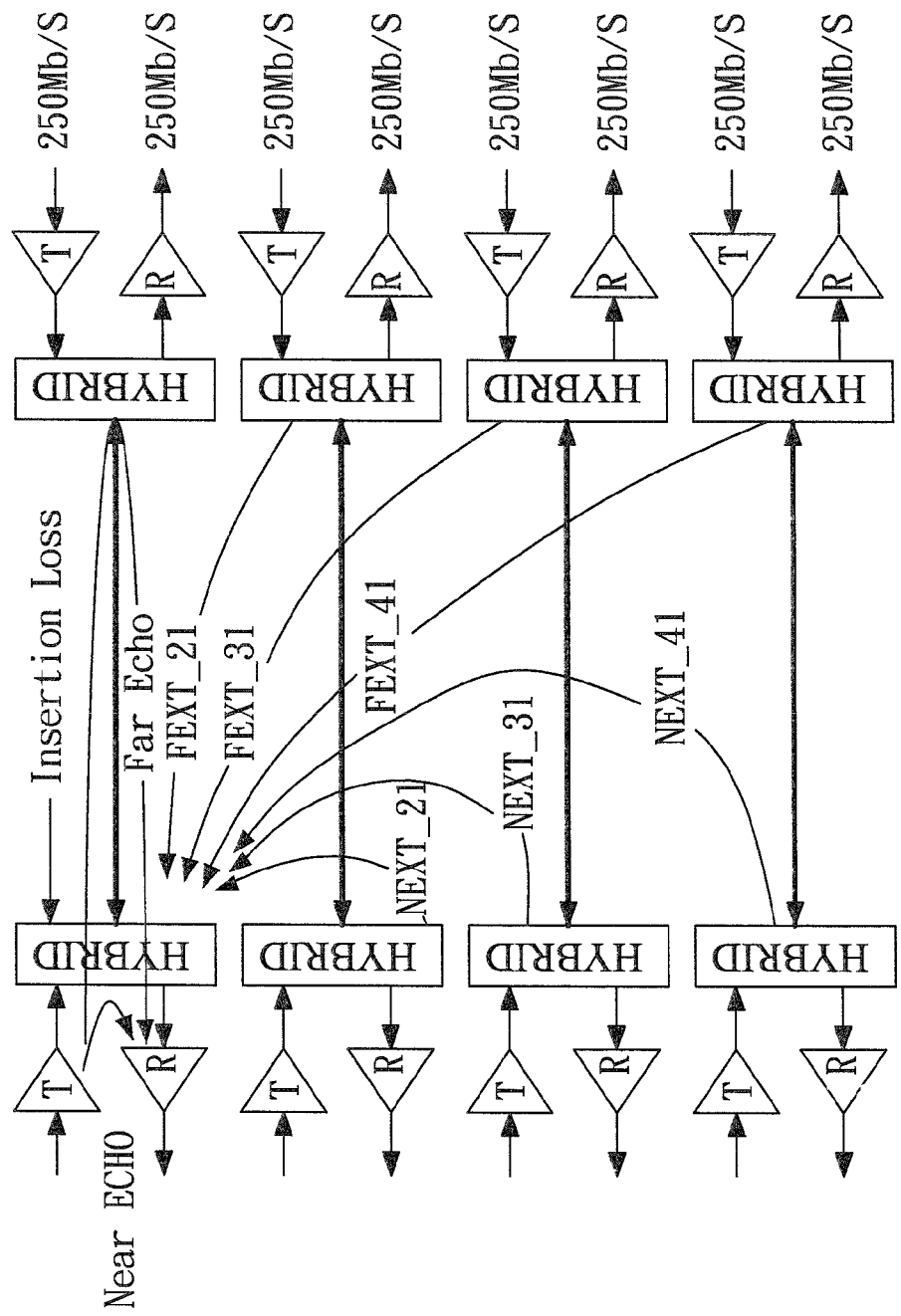
FIG. 1 schematically shows a communication system compliant with gigabit Ethernet over four category-5 (CAT-5) unshielded twisted pairs (UTPs)

FIG. 1 schematically shows a communication system compliant with gigabit Ethernet over four category-5 (CAT-5) unshielded twisted pairs (UTPs). Near-end or far-end echo occurs as signals are bi-directionally transferred over each wire pair, and, near-end crosstalk (NEXT) or far-end crosstalk (FEXT) also occurs as multiple pairs are operated at the same time. Four-dimensional (4D) Trellis coded modulation (TCM) is used in gigabit Ethernet across the four pairs, each of which contributes one-dimension (1D).

Figure 2:
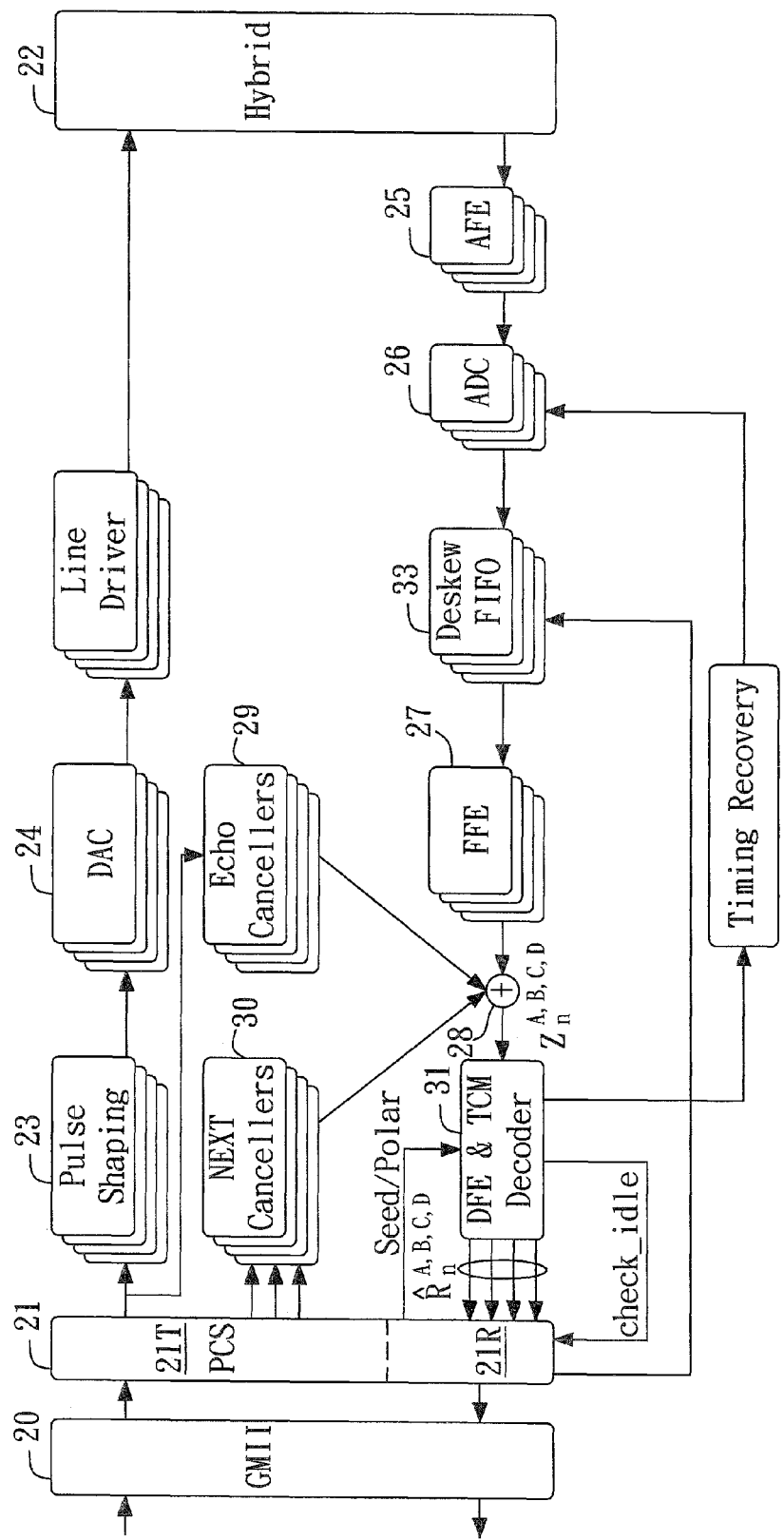
FIG. 2 shows a block diagram of a gigabit Ethernet transceiver of FIG. 1 according to one embodiment of the present invention.

FIG. 2 shows a block diagram of a gigabit Ethernet transceiver of FIG. 1 according to one embodiment of the present invention. Only blocks pertinent to the present invention, are shown in the figure. On a transmitting path, a Gigabit Medium Independent Interface (GMII) block 20 receives 8-bit (transmitting) data from Media Access Control (MAC) (not shown) and passes the 8-bit data to the transmitting section 21T of a Physical Coding Sublayer (PCS) block 21. In each dimension, possible symbols are selected from a 1D symbol set (−2, −1, 0, +, +1, +2) as depicted in FIG. 3A, a five-level pulse amplitude modulation (PAM5) constellation. The symbol set is partitioned into two symbol subsets X and Y, for example, with X={−1, +1} and Y={−2, 0, +2}. The 1D symbol subsets are then combined to form 4D symbol subsets (or code subsets) s0 to s7, according to Trellis coding, representing the four wire pairs. As shown, in FIG. 3B, each 4D symbol subset includes a union of two complementary 4D symbol subsets, e.g., XXXY and YYYX of s1.

Referring back to FIG. 2, before the symbols are transmitted to the UTPs via a hybrid block 22, the four 1D symbols are processed by pulse shaping blocks 23 (precisely speaking, partial-response filter is adopted) respectively to reduce electromagnetic interference (EMI), followed by being converted to analog signals by digital-to-analog converters (DACs) 24 operating at 125 MHz.

On a receiving path, the hybrid block 22 receives analog signals from four wire pairs. The received 4D signals are then preconditioned respectively by analog front-ends (AFEs) 25 such as programmable gain amplifiers (PGAs), baseline wander compensator (BWC), and programmable low-pass filter (PLPF), followed by being converted to digital signals by analog-to-digital converters (ADCs) 26 operating at 125 MHz. The converted digital signals are processed by feed-forward equalizers (FFEs) 27 or ISI pre-cursor equalizers. Subsequently, a summing device 28 is used to subtract echo quantity of echo cancellers 29 and near-end crosstalk quantity of NEXT cancellers 30 from the output of the FFE 27. In the specification, the output of the FFE 27 is also called a receiving signal. The cancelled signals $Z_n^{A,B,C,D}$ from the summing device 28 are processed by a joint decision feedback equalizer (DFE, or ISI post-cursor equalizer) and TCM decoder 31, thereby resulting in decoded signals $\hat{R}_n^{A,B,C,D}$, 9-bit data, which are fed to the receiving section 21R of the PCS block 21 and are then further forwarded to the GMII 20. A timing recovery block 32, which is under control of the joint DFE & TCM decoder 31, is also used to control sampling timing of the ADC 26. Deskew first-in-first-out (FIFO) 33 is used to compensate the difference in arrival time of signals received simultaneously from the four wire pairs. The deskew FIFO 33 may be disposed between, the ADC 26 and the FFE 27, or between the summing device 28 and the joint DFE & TCM decoder 31.

FIG. 4 shows trellis state transition of a convolutional code, i.e., Trellis code. In the trellis diagram, the nodes at the first column represent possible states (state 0 to state 7) that the convolutional encoder 212 (FIG. 3) may assume at time n. Similarly, the nodes at the second and third columns represent possible states at time n+11 and n+2 respectively. From a current state, a subsequent 4D symbol corresponds to a transition (or branch) from the current state to a permissible succeeding state. In, other words, each branch may be characterized, by a current state, a preceding state and a corresponding 4D symbol. Accordingly, a valid sequence of states (or a valid sequence of 4D symbols) may be represented by a path through the trellis. The trellis diagram may be adapted, at the receiver end, to decode the signals $Z_n^{A,B,C,D}$ (FIG. 2), by the joint DFE & TCM decoder 31, according to Viterbi algorithm. Given a sequence of received symbols, the most likable path to every node is calculated and the distance between, each path and the received sequence is determined in order to determine a path metric.

Figure 5:
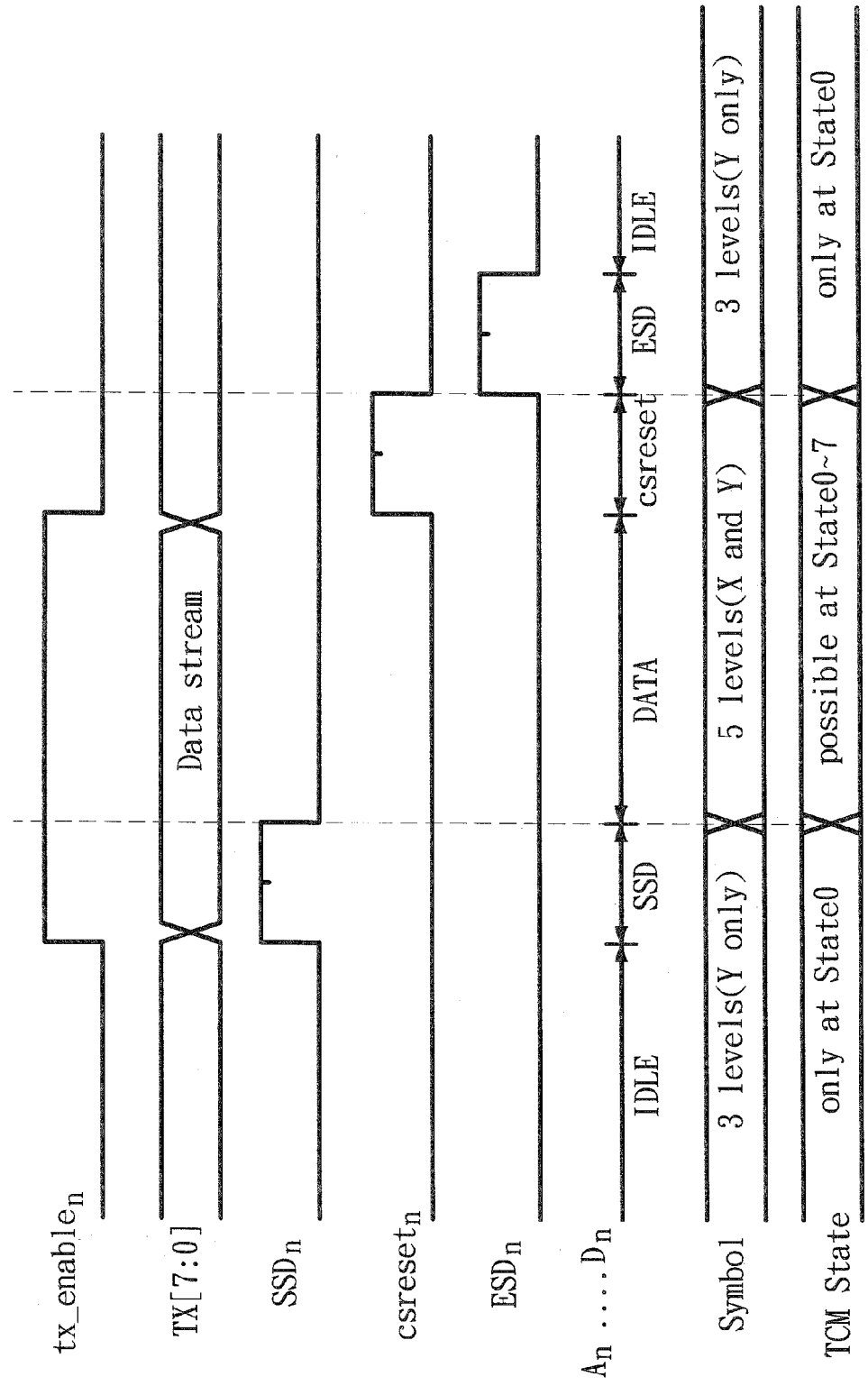
FIG. 5 shows a timing diagram illustrative of some pertinent signals in an idle period and a data period.

FIG. 5 shows a timing diagram illustrative of some pertinent signals in an idle period and a data (transfer) period. In, data period, five-level symbol subsets X and Y are used to represent states 0-7; in idle period (including inter-packet gaping), only three-level Y symbol subset is used to represent state 0, including idle vectors and extended carriers. Specifically speaking, a start-of-stream delimiter (SSD) having two symbols SSD1 and SSD2 is generated at the beginning of the data period. After the end of the data period, a convolutional state reset (csrest) having two symbols is generated, followed by an end-of-stream delimiter (ESD) having two symbols that may be composed of ESD1 and ESD2_EXT0 or may be composed, of ESD_EXT1 and ESD_EXT2.

Figure 6A:
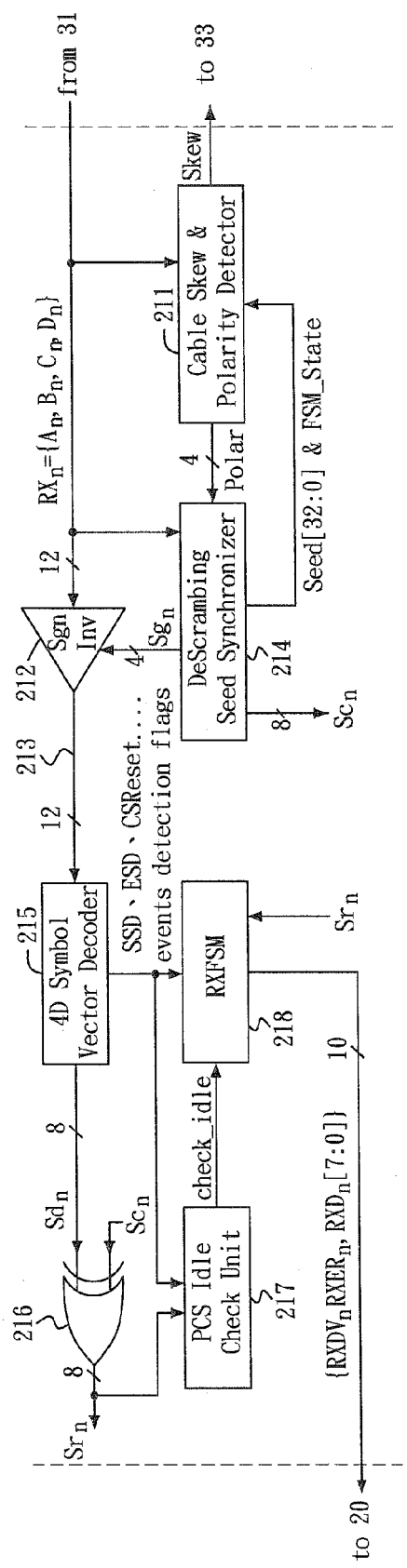
FIG. 6A shows a detailed, block diagram of the receiving section of the PCS block of FIG. 2.

FIG. 6A shows a detailed block diagram of the receiving section 21R of the PCS block 21 (FIG. 2). Received symbols $Rx_n$ from the joint DFE & TCM decoder 31 are detected by a cable skew & polarity detector 211 to obtain a mutual skew information among the receiving 4 pairs UTP cable (for the deskew FIFO 33) and a polarity characterization (Polar). The received symbols $Rx_n$ are polarity-compensated by a polarity-compensator 212 to generate polarity-compensated symbols 213. A descrambling seed synchronizer 214 generates a seed value for the cable skew & polarity detector 211 and generates some pseudorandom signals $Sg_n$ and $Sc_n$ according to the received symbols $Rx_n$ and the polarity characterization. The polarity-compensated symbols 213 are processed by a 4D symbol vector decoder 215 and are then descrambling by an 8 bit wise exclusive-OR logic gate 216 to recover the corresponding transmitted symbols $Sr_n$ at remote side. A PCS idle check unit 217 generates a check_idle value according to the recovered symbols $Sr_n$ and some event detection flags (e.g., SSD, ESD and csreset events detection flags) from the 4D symbol vector decoder 215. It is noted that the check_idle value is a Boolean value used to indicate an idle mode. A finite-state-machine (FSM) 218 is coupled to receive the check_idle value and the event detection, flags, and then, outputs results to the GMII 20.

Figure 6B:
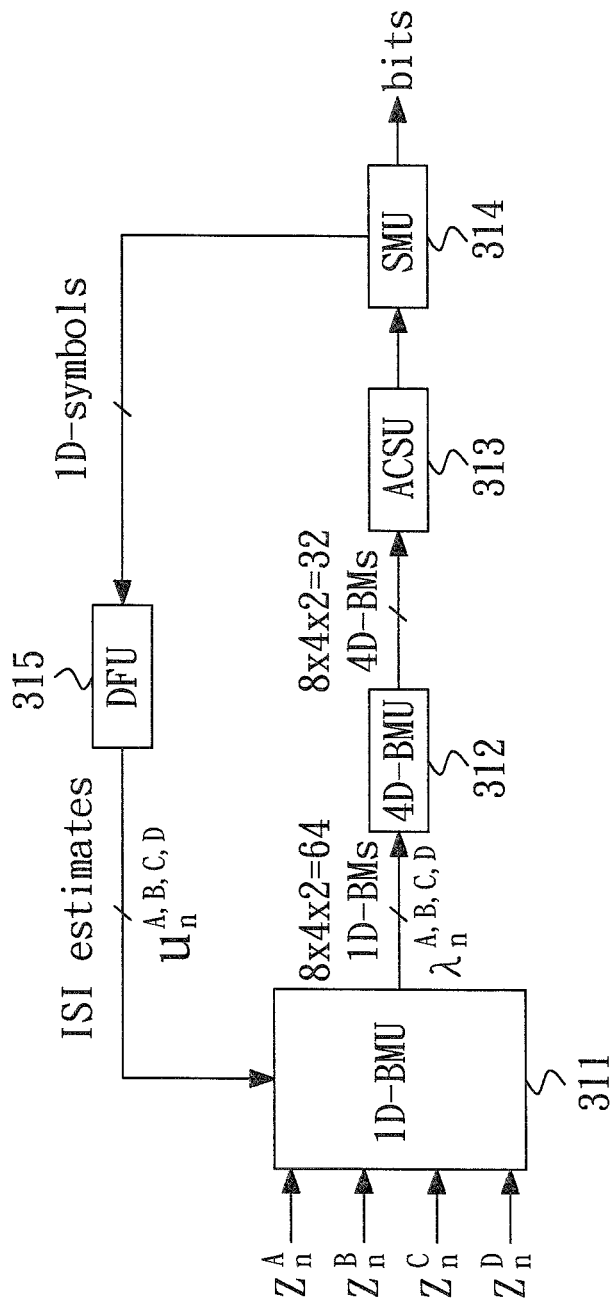
FIG. 6B shows a detailed block diagram of the joint DFE & TCM decoder of FIG. 2.

FIG. 6B shows a detailed block diagram of the joint DFE & TCM decoder 31 (FIG. 2), which includes a 1D branch metric unit (1D-BMU) 311, a 4D branch metric unit (4D-BMU) 312, an add-compare-select unit (ACSU) 313, a survivor memory unit (SMU) 314 and a decision feedback unit (DFU) 315. Among the blocks shown in FIG. 6B, the 1D-BMU 311, the 4D-BMU 312, the ACSU 313 and the SMU 314 collectively form the TCM decoder, which then, joints the DFU 315. Specifically, the 1D-BMU 311 calculates 1D branch metrics $\lambda_n^{A,B,C,D}$, and the 4D-BMU 312 combines the 1D branch metrics (1D-BMs) from the 1D-BMU 311- to generate 4D branch metrics (4D-BMs). Subsequently, the ACSU 313 performs ACS operation, on the 4D-BMs, for each code state, to obtain path metrics. According to one aspect of the present invention, the SMU 314 of the present embodiment stores to keep track of symbols, rather than storing surviving state transition to record path history as in conventional counterpart. The DFU 315 of the present embodiment is coupled to receive the 1D symbols directly from the SMU 314 in order to estimate ISI quantity $u_n^{A,B,C,D}$, which is then fed back to the 1D-BMU 311 to assist in 1D-BMs calculation.

Figure 7A:
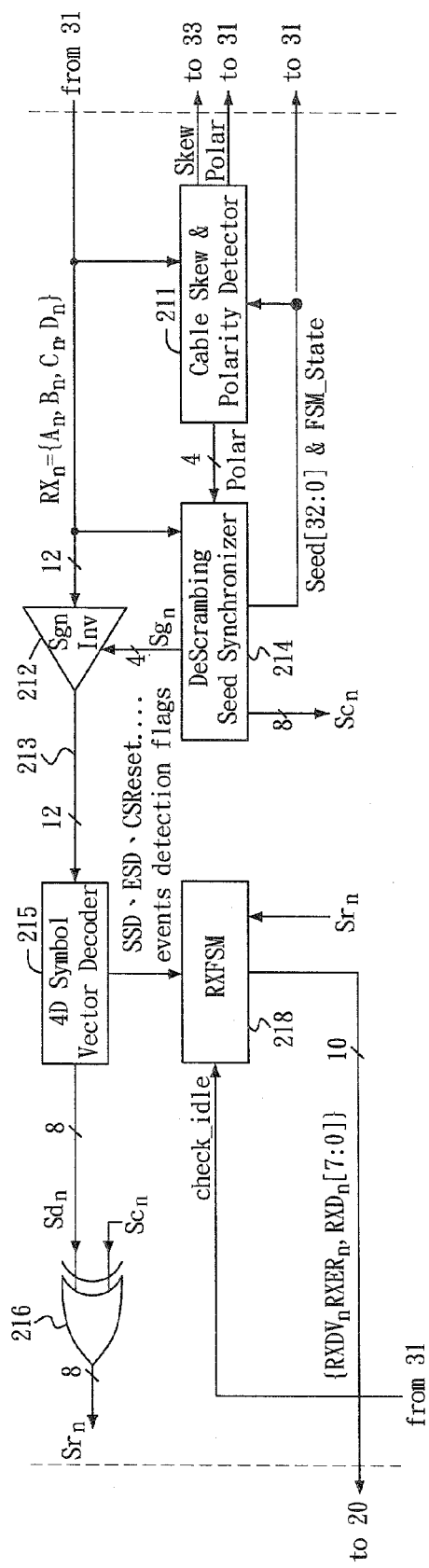
FIG. 7A shows a detailed, block diagram of the receiving section of the PCS block of FIG. 2 according to one embodiment of the present invention.

FIG. 7A shows a detailed, block diagram of the receiving section 21R of the PCS block 21 (FIG. 2) according to one embodiment of the present invention. The structure of FIG. 7A is similar to that of FIG. 6A except for the following differences. In the present embodiment (FIG. 7A), in addition to the skew information, the polarity characterization and the seed, value are also provided, to the joint DFE & TCM decoder 31 (FIG. 2). The check_idle value (for the FSM 218) is generated from the joint DFE & TCM decoder 31 (FIG. 2), rather than from the PCS idle check unit 217, which is now not necessary in the present embodiment (FIG. 7A).

Figure 7B:
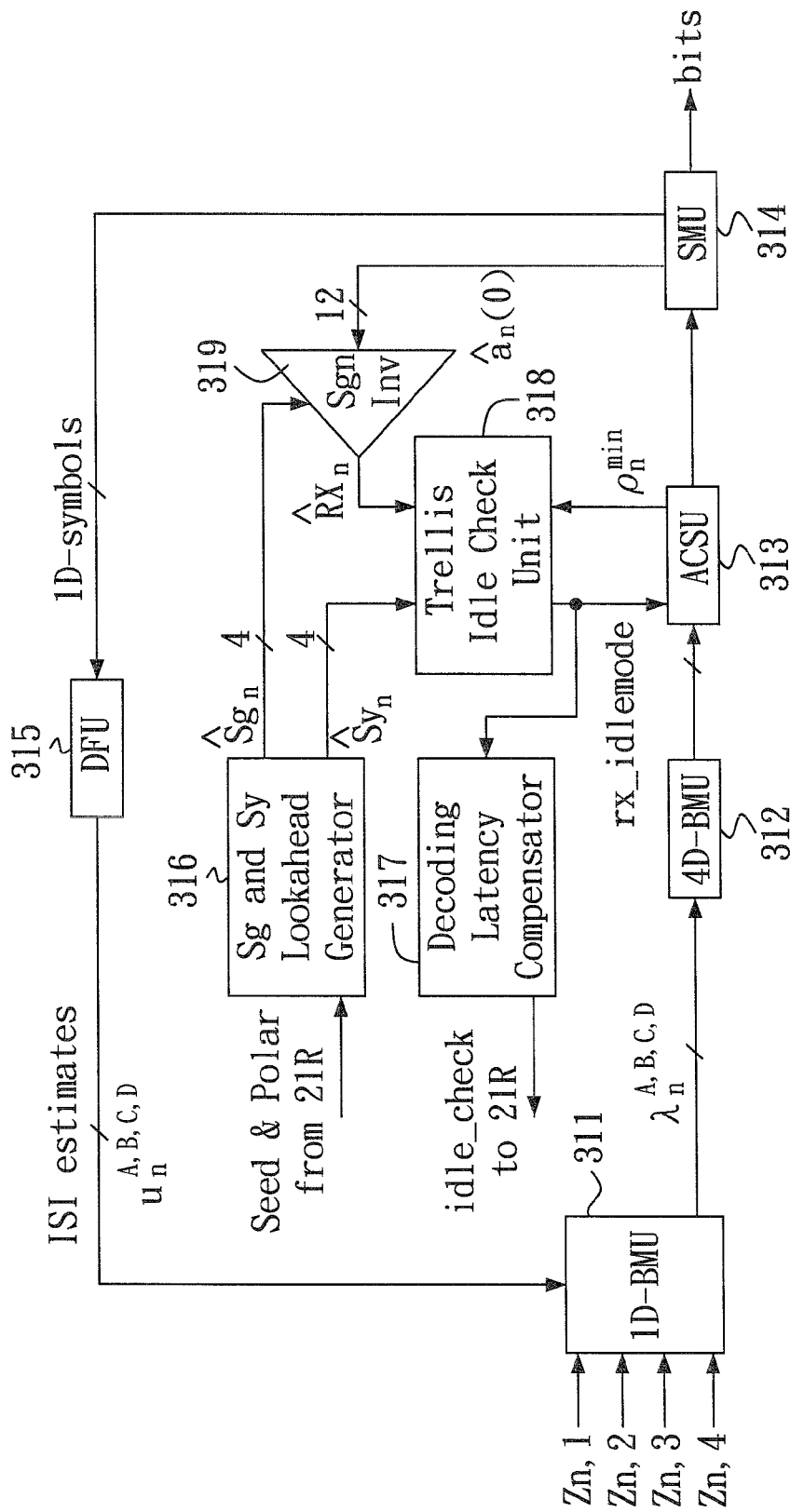
FIG. 7B shows a detailed block diagram of the joint DFE & TCM decoder of FIG. 2 according to one embodiment of the present invention.
Figure 7C:
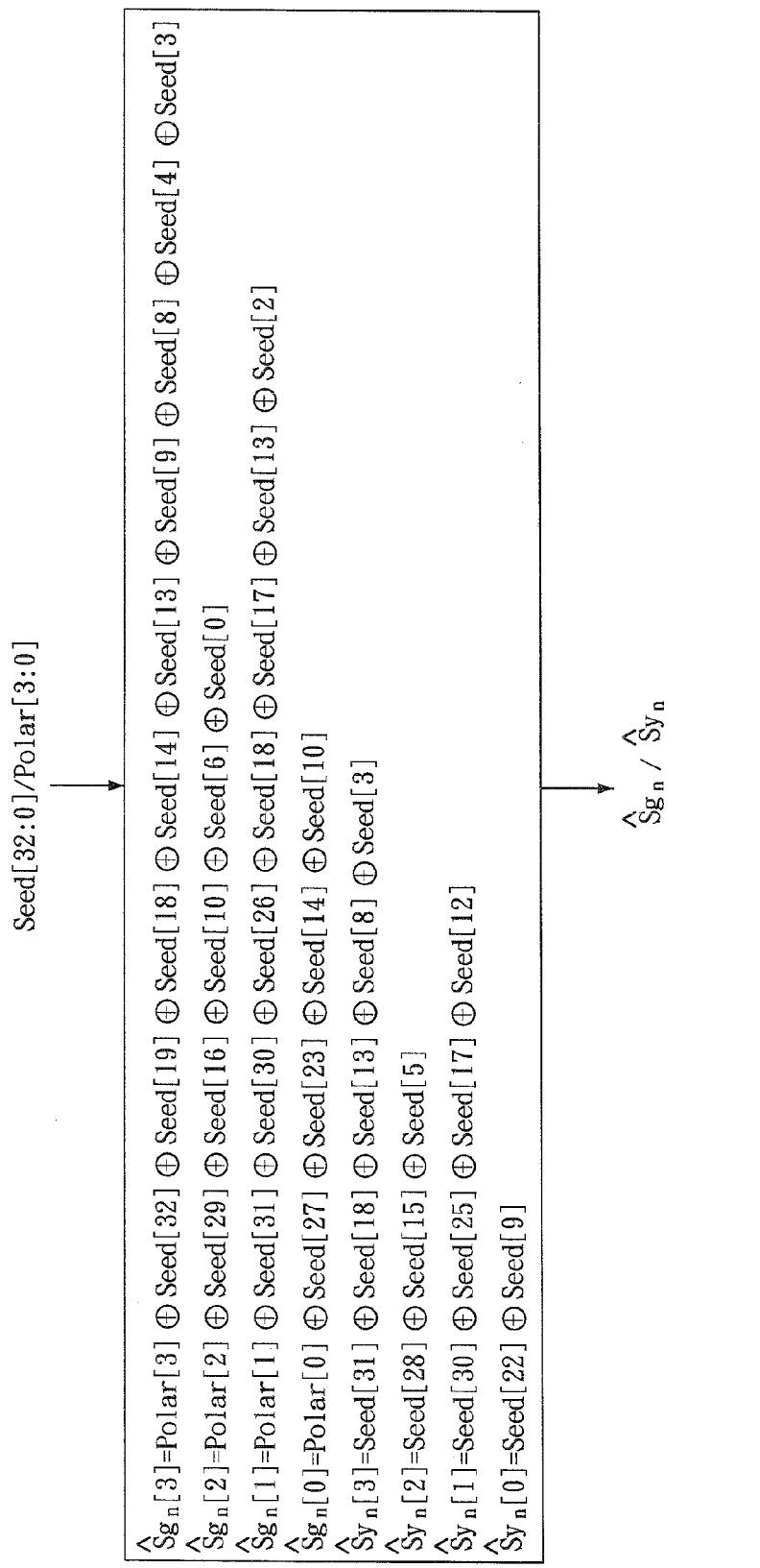
FIG. 7C shows an exemplary lookahead generator in case of 10T TCM decoding latency.

FIG. 7B shows a detailed block diagram of the joint DFE & TCM decoder 31 (FIG. 2) according to one embodiment of the present invention. The structure of FIG. 7B is similar to that of FIG. 6B except for the following differences. In addition to the 1D-BMU 311, the 4D-BMU 312, the ACSU 313, the SMU 314 and the DFU 315, the joint DFE & TCM decoder 31 further includes a lookahead generator 316, a decoding latency compensator 317, a Trellis idle check unit 318 and a polarity-compensator 319. Specifically, the lookahead generator 316 is configured to generate a first pseudorandom signal $\hat{S}g_n$ (for the polarity-compensator 319) and a second pseudorandom signal $\hat{S}y_n$ (for the Trellis idle check unit 318) according to the seed and polarity characterization. An exemplary lookahead generator in case of 10T (10 symbol times) TCM decoding latency is shown in FIG. 7C. The decoding latency compensator 317 is configured to generate the check_idle value according to an idle-mode signal rx_idlemode from the Trellis idle check unit 318. The polarity-compensator 319 is coupled to receive the first pseudorandom signal $\hat{S}g_n$ and a symbol $\hat{a}_n(0)$ of state 0 from the SMU 314, and accordingly generates a polarity-compensated symbol $\hat{R}x_n$. The Trellis idle check unit 318 generates the idle-mode signal rx_idlemode according to the second pseudorandom signal $\hat{S}y_n$, the polarity-compensated symbol $\hat{R}x_n$, and a minimum state $\rho_n^{min}$ (from the ACSU 313).

Figure 8:
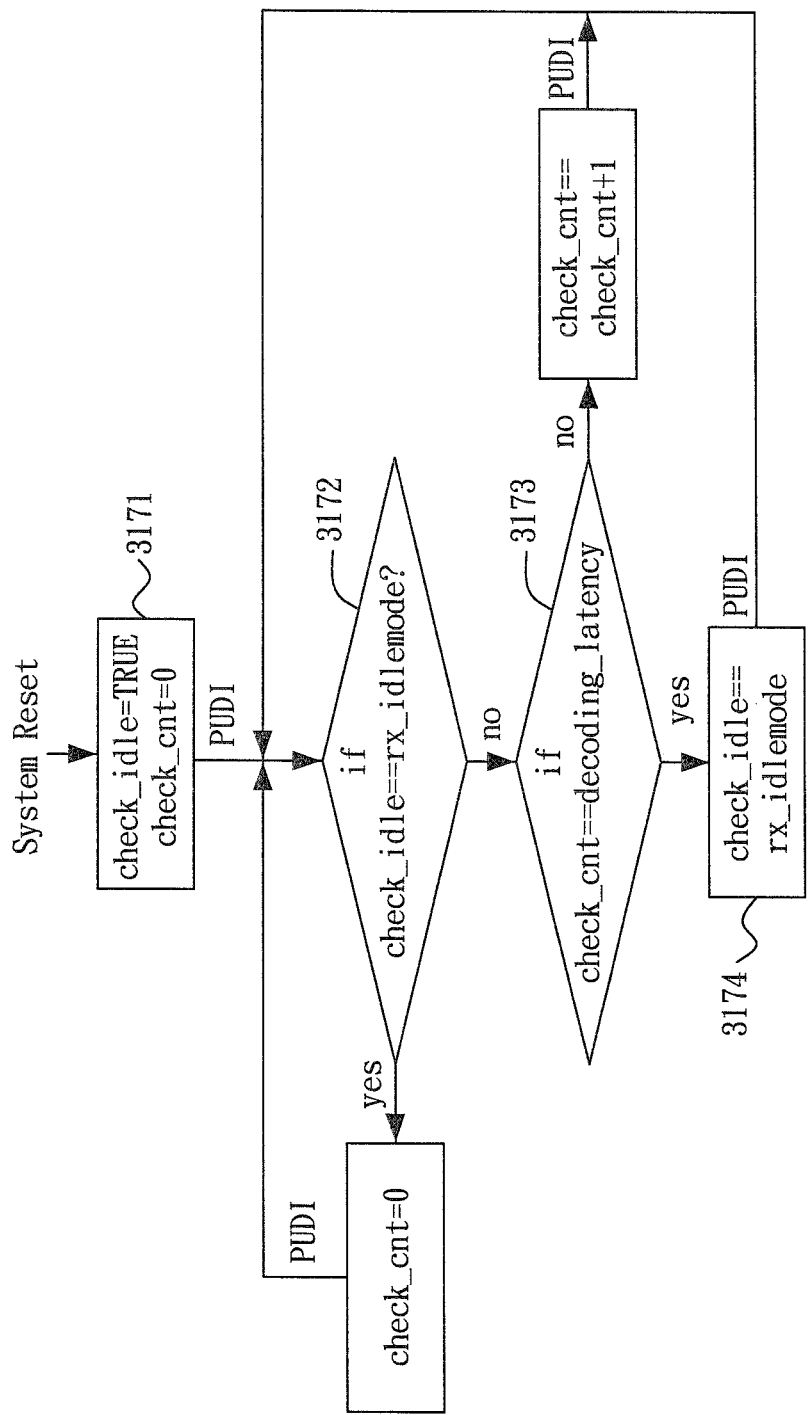
FIG. 8 shows an exemplary flow diagram of the decoding latency compensator of FIG. 7B.

FIG. 8 shows an exemplary flow diagram of the decoding latency compensator 317 (FIG. 7B). In step 3171, the check_idle value is TRUE after a system reset. In case that the idle-mode signal rx_idlemode (from the Trellis idle check unit 318) does not conform to the check_idle value (step 3172) for a latency length of a predetermined number (e.g., decoding_latency) of symbol times (PUDI or PMA unit data indicator) (step 3173), the idle-mode signal rx_idlemode is then assigned to the check_idle value (step 3174).

Figure 9:
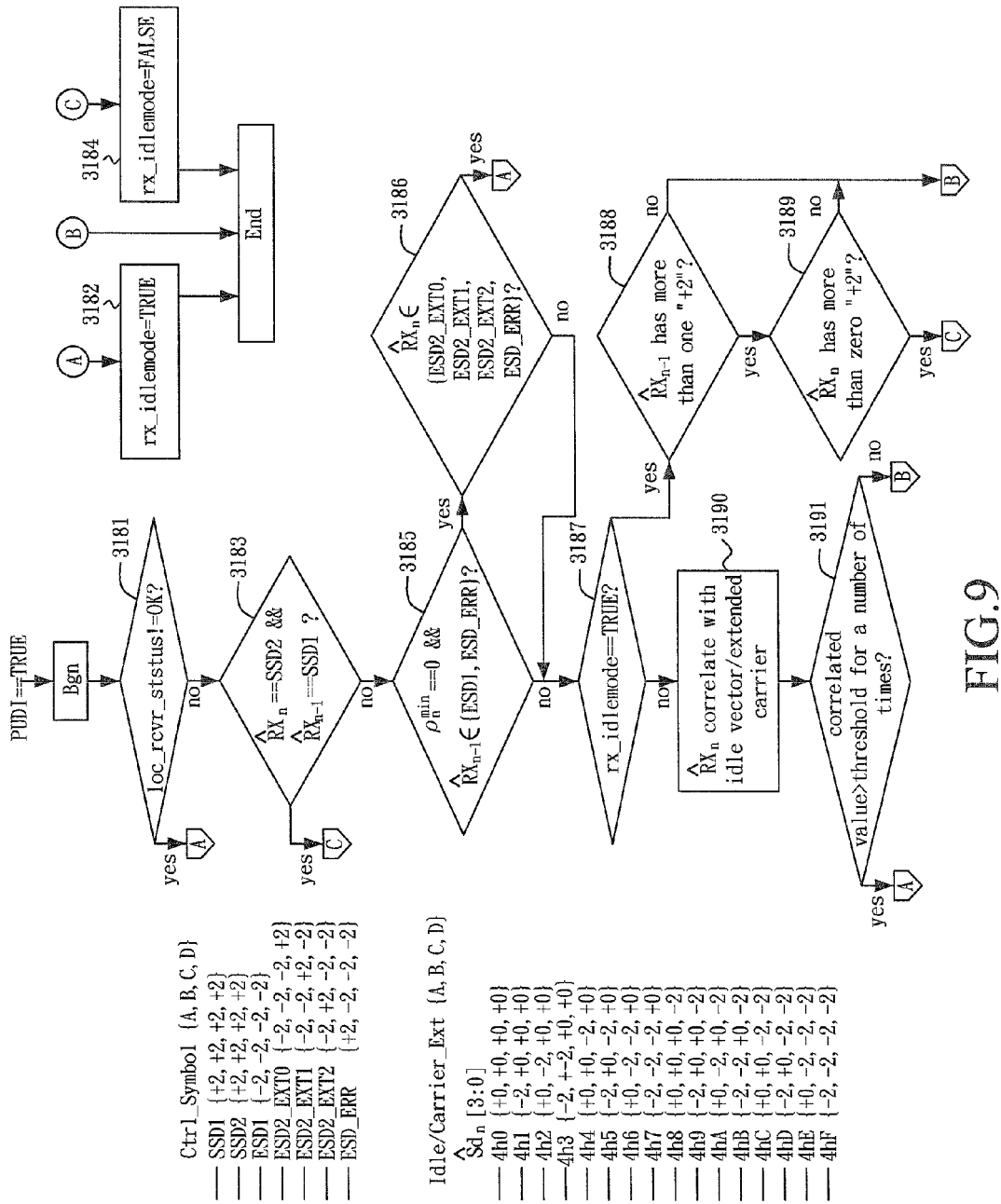
FIG. 9 shows an exemplary flow diagram of the Trellis idle check unit of FIG. 7B according to one embodiment of the present invention.

FIG. 9 shows an exemplary flow diagram of the Trellis idle check unit 318 (FIG. 7B) according to one embodiment of the present invention. In step 3181, when the parameter loc_rcvr_status is not OK, indicating that the receive link is not satisfactory, the idle-mode signal rx_idlemode is set to TRUE (step 3182), indicating that the receiver should be in the idle mode. Otherwise, in step 3183, the current and preceding polarity-compensated, symbols $\hat{R}x_n$, and $\hat{R}x_{n-1}$ are checked whether they are SSD symbols (i.e., SSD1 and SSD2). If the check result is positive, indicating that the receiver should be in the data mode and the idle-mode signal rx_idlemode is thus set to FALSE (step 3184). If the check result of step 3183 is negative, it is determined in step 3185 whether the minimum state $\rho_n^{min}$ is state 0 and determined in step 3186 whether the current and preceding polarity-compensated symbols $\hat{R}x_n$, and $\hat{R}x_{n-1}$, are valid ESD symbols. If both steps 3185 and 3186 are confirmed, the idle-mode signal rx_idlemode is set to TRUE (step 3182), indicating that the receiver should be in the idle mode. Otherwise, the idle-mode signal rx_idlemode is checked in step 3187. If the check result of step 3187 is positive, indicating that the receiver may probably be in the idle mode, it is further determined whether the preceding polarity-compensated 1D symbol $\hat{R}x_{n-1}$, has more than one "+2" (step 3188) and the current polarity-compensated 1D symbol $\hat{R}x_n$ has more than, zero "+2" (step 3189). If both step 3188 and 3189 are confirmed, indicating that the receiver should be in the data mode and the idle-mode signal rx_idlemode is thus set to FALSE (step 3184). Otherwise, the idle-mode signal rx_idlemode is retained. If the check result of step 3187 is negative, indicating that the receiver may probably be in the data mode, the current polarity-compensated symbol $\hat{R}x_n$ is correlated with the idle vector or the extended carrier according to the second pseudorandom signal $\hat{S}y_n$ (step 3190) and is determined, in step 3191, whether the correlated value is greater than a predetermined threshold for a number of times. If step 3191 is confirmed, the idle-mode signal rx_idlemode is set to TRUE (step 3182), indicating that the receiver should, be in the idle mode. Otherwise, the idle-mode signal rx_idlemode is retained.

Figure 10A:
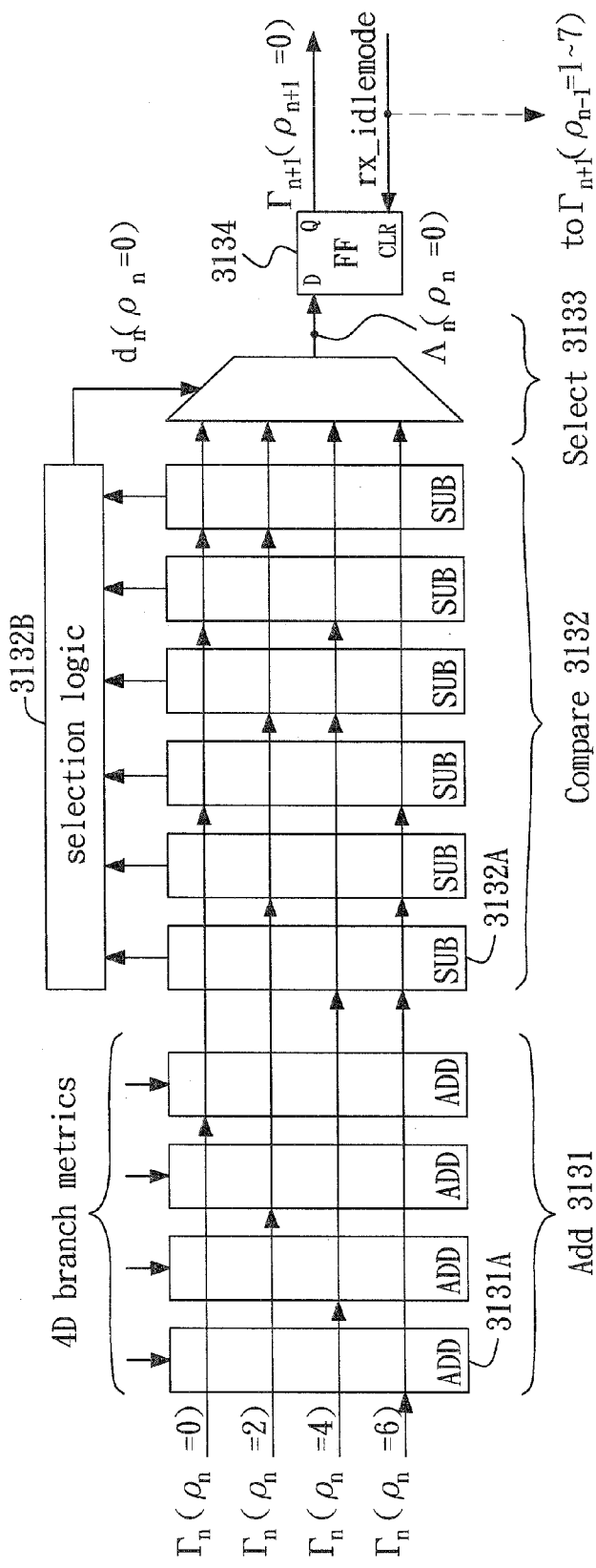
FIG. 10A shows a detailed block diagram exemplifying the ACSU of FIG. 7B for updating the path metrics for state 0.

FIG. 10A shows a detailed block diagram exemplifying the ACSU 313 for updating the path metrics for state 0. The ACSU 313 generally includes an add portion 3131, a compare portion 3132 and a select portion 3133. Specifically, the add portion 3131 adds the 4D branch metrics to the current path metrics $\Gamma_n$ by adders 3131A respectively. Subsequently, the outputs of the add portion 3131 are compared, e.g., two by two, by comparators 3132A such as subtracting devices (SUBs). The comparison results are processed by a selection logic 3132B to result in a decision value $d_n$, which selects the output $\Lambda_n$ of the add portion 3131 with least value. An updated path metric $\Gamma_{n+1}$ may then be obtained from a flip-flop (FF) 3134 that is coupled to receive the output $\Lambda_n$ of the add portion 3131 with least value. According to one aspect of the present embodiment, the FF 3134 is asynchronously reset (or cleared) to state 0 when the idle-mode signal rx_idlemode is asserted.

Figure 10B:
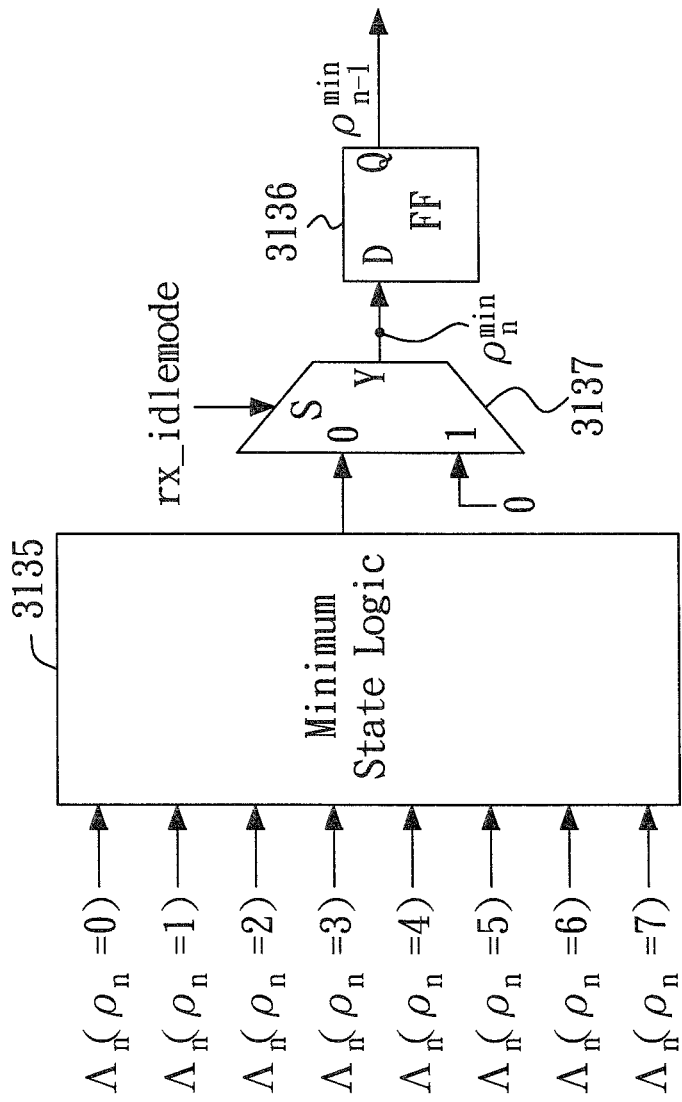
FIG. 10B shows a minimum state logic of the ACSU of FIG. 7B.

As shown in FIG. 10B, the ACSU 313 of the present embodiment may further include a minimum state logic 3135 that outputs the state $\rho_n$ with least value of the output $\Lambda_n$ of the select portion 3133, thereby resulting in a minimum state $\rho_n^{min}$ at time n. A minimum state $\rho_{n-1}^{min}$ time n−1 may be obtained, from a flip-flop (FF) 3136 that is coupled, to receive the minimum state $\rho_n^{min}$ at time n. According to one aspect of the present embodiment, a selecting device 3137 such as a multiplexer may be disposed, between the minimum state logic 3135 and the FF 3136. In, case that the idle-mode signal rx_idlemode becomes asserted, "0" is tied to the input of the FF 3136 as the minimum state $\rho_n^{min}$.

Although specific embodiments have been, illustrated and described, it will be appreciated by those skilled in the art that various modifications may be made without departing from the scope of the present invention, which is intended to be limited solely by the appended claims.

What is claimed is:

1. A recoverable Ethernet receiver, comprising:
a joint decision feedback equalizer (DFE) and Trellis decoder configured to decode a receiving signal to result in a received symbol, and configured to generate a check-idle value used to indicate an idle mode; and
a physical coding sublayer (PCS) block configured to generate a seed value and a polarity characterization according to the received symbol, wherein the joint DFE and Trellis decoder generates the check-idle value according to the seed value and the polarity characterization.

2. The recoverable Ethernet receiver of claim 1, wherein the Ethernet receiver is compliant with 1000BASE-T.

3. The recoverable Ethernet receiver of claim 1, wherein the PCS block comprises:
a polarity detector configured to detect the received symbol to generate the polarity characterization;
a descrambling seed synchronizer configured to generate the seed value according to the received symbol, said seed value being provided to the polarity detector; and
a finite-state-machine (FSM) coupled to receive the check-idle value.

4. The recoverable Ethernet receiver of claim 3, wherein the PCS block further comprises:

a polarity-compensator configured to compensate the received symbol, thereby resulting in a polarity-compensated symbol.

5. The recoverable Ethernet receiver of claim 4, wherein the PCS block further comprises:
 a symbol vector decoder configured to decode the polarity-compensated symbol; and
 an exclusive-OR logic gate configured to recover corresponding transmitted symbols according to an, output of the symbol vector decoder, thereby resulting in recovered symbols, which are fed to the FSM.

6. The recoverable Ethernet receiver of claim 1, wherein the joint DFE and Trellis decoder comprises:
 a Trellis coded modulation (TCM) decoder including:
  a one-dimensional branch metric unit (1D-BMU) configured to calculate 1D branch metrics;
  a four-dimensional branch metric unit (4D-BMU) configured to combine the 1D branch metrics to generate 4D branch metrics;
  an add-compare-select unit (ACSU) configured to perform add, compare and select (ACS) operations on the 41D branch metrics for each state to obtain path metrics;
  a survivor memory unit (SMU) configured to store and keep track of symbols; and
  a decision, feedback unit (DFU) coupled to receive the symbols from the SMU in, order to estimate inter-symbol interference (ISI) quantity, which is then fed, back to the 1D-BMU.

7. The recoverable Ethernet receiver of claim 6, wherein the joint DFE and Trellis decoder further comprises:
 a lookahead generator configured to generate at least one pseudorandom signal according to the seed value and the polarity characterization;
 a compensator coupled to receive a symbol from the SMU, thereby resulting in a compensated symbol;
 a Trellis idle check unit configured to generate an idle-mode signal according to the pseudorandom signal; and
 a decoding latency compensator configured to generate the check-idle value according to the idle-mode signal.

8. The recoverable Ethernet receiver of claim 7, wherein the decoding latency compensator performs the following step:
 assigning the idle-mode signal to the check-idle value, if the idle-mode signal does not conform to the check-idle value for a latency length of a predetermined number of symbol times.

9. The recoverable Ethernet receiver of claim 8, wherein the ACSU comprises:
 an add portion configured to add the 4D branch metrics to current path metrics;
 a compare portion configured to compare outputs of the add portion, thereby resulting in a decision value;
 a select portion configured to select the least-value output of the select portion according to the decision value; and
 a flip-flop coupled to receive the least-value output of the add portion, thereby resulting in an, updated path metric;
 wherein flip-flop is reset when the idle-mode signal is asserted.

10. The recoverable Ethernet receiver of claim 9, wherein the ACSU further comprises a minimum state logic configured to output a minimum state corresponding to the least-value output of the select portion, wherein a state "0" is selected as the minimum state when, the idle-mode signal is asserted.

11. The recoverable Ethernet receiver of claim 7, wherein the Trellis idle check unit performs the following steps:
 checking the current and preceding compensated symbols to determine whether they are start-of-stream delimiter (SSD) symbols; and
 checking the current and preceding compensated symbols to determine whether they are end-of-stream delimiter (ESD) symbols.

12. The recoverable Ethernet receiver of claim 11, wherein the Trellis idle check unit further performs the following step:
 determining the number of state "+2" in the current and preceding compensated symbols.

13. The recoverable Ethernet receiver of claim 11, wherein the Trellis idle check unit further performs the following steps:
 correlating the current compensated symbol with an idle vector or an extended carrier according to the pseudorandom signal, thereby generating a correlated value; and
 comparing the correlated value with a predetermined threshold for a number of times.

* * * * *